US012322232B2

(12) United States Patent
Yada et al.

(10) Patent No.: US 12,322,232 B2
(45) Date of Patent: Jun. 3, 2025

(54) KNOB HOLDING STRUCTURE AND SMART LOCK

(71) Applicant: FCL Component Limited, Tokyo (JP)

(72) Inventors: Yuji Yada, Tokyo (JP); Tetsuhiro Ishikawa, Tokyo (JP)

(73) Assignee: FCL Components Limited, Tokyo (JP)

( * ) Notice: Subject to any disclaimer, the term of this patent is extended or adjusted under 35 U.S.C. 154(b) by 112 days.

(21) Appl. No.: 18/487,927

(22) Filed: Oct. 16, 2023

(65) Prior Publication Data

US 2024/0177552 A1 May 30, 2024

(30) Foreign Application Priority Data

Nov. 30, 2022 (JP) ................................ 2022-191806

(51) Int. Cl.
*G07C 9/00* (2020.01)

(52) U.S. Cl.
CPC ................................ *G07C 9/00944* (2013.01)

(58) Field of Classification Search
CPC ...... E05B 17/00; E05B 47/0012; E05B 47/02; E05B 49/00; E05B 2047/0083; E05B 2047/0091
USPC ........................................................... 70/275
See application file for complete search history.

(56) References Cited

U.S. PATENT DOCUMENTS 2,280,553 A * 4/1942 Srygley ..................... E05G 1/12 109/34
2,610,877 A * 9/1952 Weaver ................. E05B 13/001 16/DIG. 30
4,503,692 A * 3/1985 Grint ..................... E05B 13/001 70/424
6,089,058 A * 7/2000 Elpern ................ E05B 47/0012 70/279.1
6,122,945 A * 9/2000 Grant .................... E05B 17/145 70/426
6,658,906 B1 * 12/2003 Wright .................. E05B 13/001 70/424
6,687,957 B2 * 2/2004 Worrell .................... G05G 1/10 292/351
6,918,276 B2 * 7/2005 Van Parys ........... E05B 47/0012 70/257
7,334,824 B2 * 2/2008 Sundberg ............ E05B 65/0014 292/336.3
7,802,828 B2 * 9/2010 Hopkins ............... E05B 13/001 292/288
9,672,674 B2 * 6/2017 Meganck ................. G07C 9/23
2006/0006678 A1 * 1/2006 Herron .................. E05B 1/0069 292/336.3

(Continued)

FOREIGN PATENT DOCUMENTS

DE 102017127982 A1 5/2019
JP 2018-028259 A 2/2018
JP 2020-204164 A 12/2022

*Primary Examiner* — Nathan Cumar
(74) *Attorney, Agent, or Firm* — Shumaker & Sieffert, P.A.

(57) ABSTRACT

A knob holding structure according to one aspect of the present disclosure has a holder, a pair of pinching members configured to hold a knob and arranged opposed to each other in the holder, and an elastic member configured to support the pair of pinching members so that each pinching member can be displaced relative to an inner surface of the holder, and to bias the pinching members in a direction so as to approach each other.

5 Claims, 4 Drawing Sheets

(56) References Cited

U.S. PATENT DOCUMENTS

| | | | | |
|---|---|---|---|---|
| 2010/0231350 | A1* | 9/2010 | Scharer | E05B 63/0017 340/5.2 |
| 2016/0040452 | A1* | 2/2016 | Ku | E05B 47/0012 292/336.3 |
| 2017/0002586 | A1* | 1/2017 | Lee | E05B 39/00 |
| 2017/0037937 | A1* | 2/2017 | Ku | E05B 47/0046 |
| 2018/0061163 | A1* | 3/2018 | Ku | E05B 63/0056 |

* cited by examiner

A-A SECTION

KNOB HOLDING STRUCTURE AND SMART LOCK

CROSS-REFERENCE TO RELATED APPLICATIONS

This application is based upon and claims the benefit of priority of the prior Japanese Patent Application No. 2022-191806 filed on Nov. 30, 2022, the entire content of which is incorporated herein by reference.

BACKGROUND

A certain aspect of the embodiments relates to a knob holding structure and a smart lock.

A conventional smart lock is a device which unlocks and locks a door by password input, fingerprint authentication, or remote control from an electronic device such as a smartphone, and has a holding means for holding a knob to unlock and lock the door such as a thumb-turn, and a drive means for rotating the holding means.

A mechanism has been proposed, wherein an error in a mounting position of a smart lock with respect to a door can be absorbed by the mechanism. For example, a smart lock device is well known which has a configuration in which a soft rubber sleeve is inserted inside a cover configured to fix a thumb-turn.

Also, there is known a technique for correcting a deviation or eccentricity between a door lock and a door installation mechanism, by using rubber, sponge, robot fingers, etc. as a coupling for rotating the thumb-turn.

RELATED ART

[Patent Literature 1] JP 2020-204164 A
[Patent Literature 2] JP 2018-028259 A

When attaching a smart lock to a door, etc., in order to securely fix a knob holding means to a knob with their rotation centers aligned, the two are positioned and then fixed using screws, etc. However, such positioning and fixing operations are complicated and troublesome work for an operator.

Although some techniques for absorbing the positioning error have been proposed as described above, there is a demand for a knob holding structure and a smart lock having a simpler configuration and a structure which can improve the efficiency of operations related to positioning and fixing.

SUMMARY

A knob holding structure according to one aspect of the present disclosure comprises: a holder; a pair of pinching members configured to hold a knob and arranged opposed to each other in the holder; and an elastic member configured to support the pair of pinching members so that each pinching member can be displaced relative to an inner surface of the holder, and to bias the pinching members in a direction so as to approach each other.

A smart lock according to another aspect of the present disclosure comprises: the above knob holding structure and a drive mechanism configured to rotationally drive the holder.

According to the present disclosure, when attaching the smart lock to a door, etc., the pair of pinching members can be automatically elastically displaced corresponding to the position and/or the shape of the knob. Therefore, the knob can be appropriately held while greatly reducing the amount of work required of the operator.

DESCRIPTION OF EMBODIMENTS

Hereinafter, a description will be given of the embodiment of the present invention with reference to the drawings.

Figure 1:
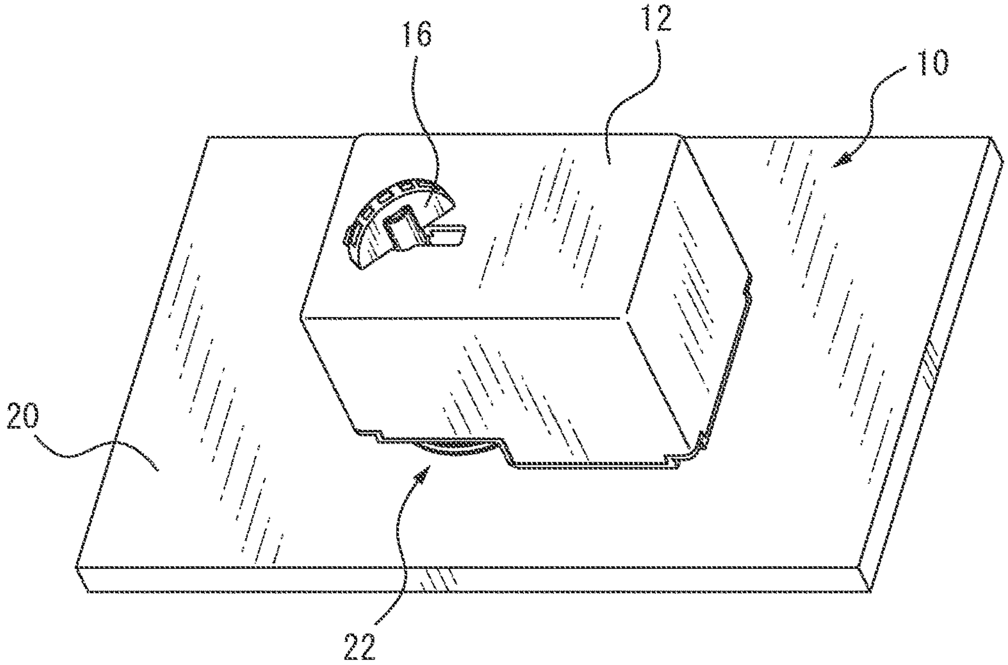
FIG. 1 is a perspective view of a smart lock according to an embodiment.
Figure 2:
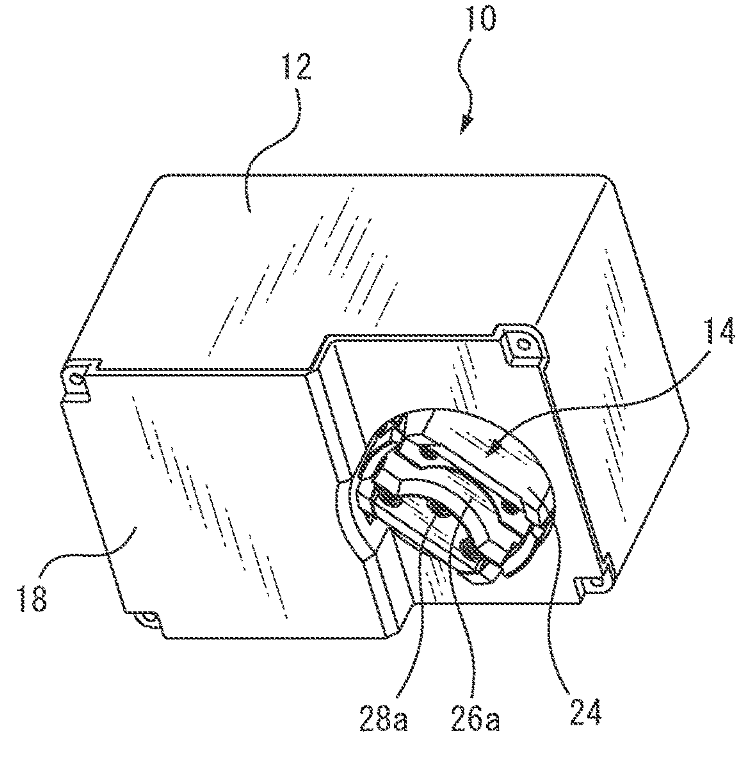
FIG. 2 is a perspective view of the smart lock of FIG. 1 viewed from another angle.
Figure 3:
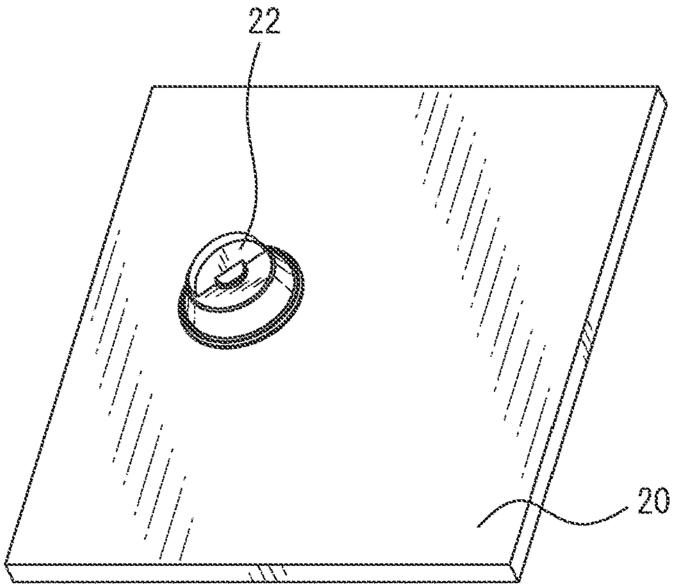
FIG. 3 is a perspective view showing an object to which the smart lock is attached.

FIG. 1 is a perspective view of a smart lock 10 according to a preferred embodiment, and FIG. 2 is a perspective view of the smart lock 10 viewed from a different angle than FIG. 1. The smart lock 10 includes a housing 12, a knob holding structure 14 arranged in the housing 12, and a drive mechanism 50 (see FIG. 7) arranged in the housing 12 and configured to rotationally drive the knob holding structure 14 relative to the housing 12. The smart lock 10 is configured, for example, to rotate a thumb-turn type knob 22 arranged on a door 20, partially shown in FIG. 3, by remote control. For example, while the knob holding structure 14 holds the knob 22, the drive mechanism 50 can rotationally drive the knob holding structure 14 by remote control from an electronic device (not shown) such as a smart phone, thereby rotating the knob 22. The knob 22 is not limited to a thumb-turn, and may include a lever, a latch, etc., which locks and unlocks the door by being rotated or moved.

Figure 6:
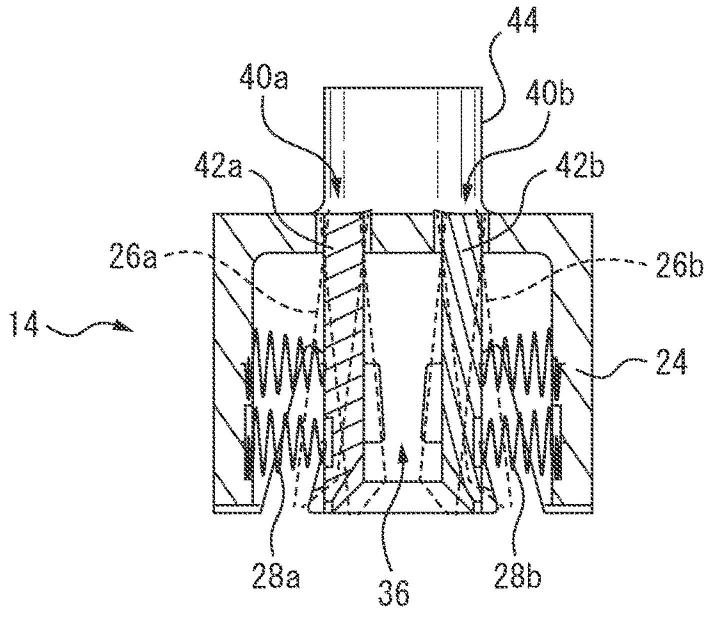
FIG. 6 is a cross-sectional view along an A-A line of FIG. 5.

The smart lock 10 can be attached to door 20 by various means. For example, an attachment surface 18 of the smart lock 10 as shown in FIG. 2 can be adhered to the door 20 in place by using a double-sided adhesive tape or adhesive agent, etc. (not shown). As also shown in FIG. 1, the smart lock 10 may have an operation knob 16 connected to the knob holding structure 14 so that the knob 22 may also be manually rotated. The operation knob 16 is connected to, for example, a rotary shaft part 44 as shown in FIG. 6.

Figure 4:
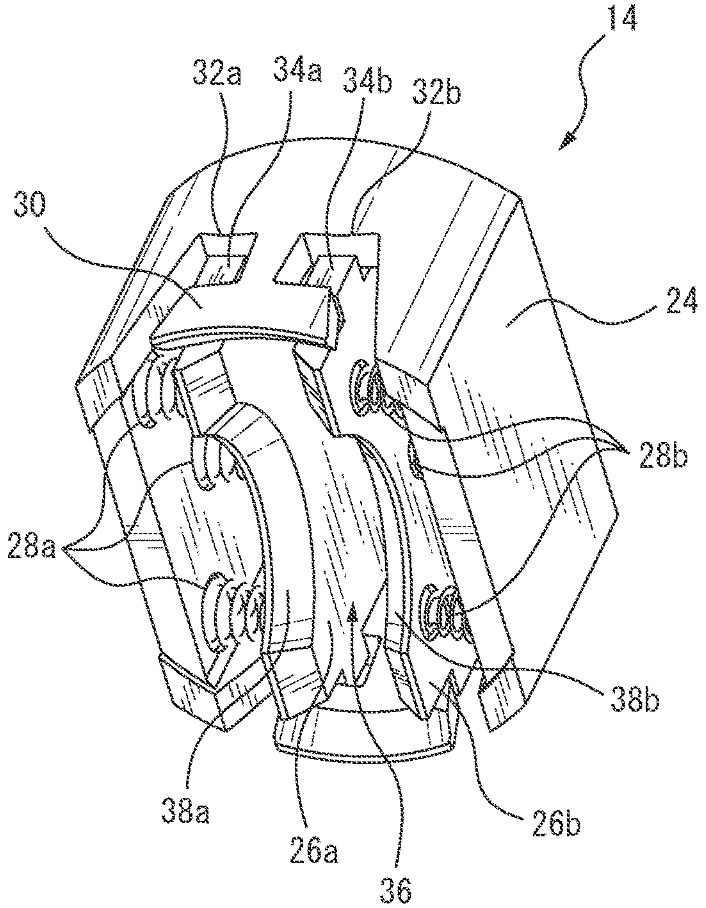
FIG. 4 is a perspective view of a configuration example of a knob holding structure.

FIG. 4 is a view of a configuration example of the knob holding structure 14 as viewed from the side attached to the door 20 (hereinafter, also referred to as the bottom side). The knob holding structure 14 includes a holder 24, a pair of pinching members **26*a* and 26*b* configured to hold the knob 22 and arranged opposed to each other in the holder 24, and elastic members 28*a* and 28*b*. The clastic members 28*a* and 28*b* are configured to support the pair of pinching members 26*a* and 26*b* so that each pinching member can be displaced relative to an inner surface of the holder 24, and to bias the pinching members 26*a* and 26*b* in a direction to approach each other, respectively. In the illustrated example, the pinching members 26*a* and 26*b* are plate-like members (hereinafter also referred to as pinching plates), and the elastic members 28*a* and 28*b*** are a plurality of coil springs. There is no particular restriction on the number of coil springs.

The pair of pinching plates 26*a* and 26*b* are arranged apart from each other by a predetermined distance on the bottom side. In the illustrated example, the pair of pinching plates 26*a* and 26*b* are biased toward each other by the coil springs 28*a* and 28*b*, respectively, and are retained so as to be separated by a constant distance by a support part 30 constructed as a part of the holder 24.

More specifically, the support part 30 is formed as a substantially T-shaped part by forming slits 32*a* and 32*b* in a portion of the holder 24 in the direction in which the pair of pinching plates 26*a* and 26*b* can move toward and away from each other. On the other hand, the pinching plates 26*a* and 26*b* have protrusions 34*a* and 34*b* capable of moving in the slits 32*a* and 32*b*, respectively. Due to such a configuration, the pinching plates 26*a* and 26*b* can be elastically displaced in the direction of contacting and separating from each other within a range corresponding to the lengths of the slits 32*a* and 32*b* in the directions of the displacements of the pinching plates 26*a* and 26*b*, respectively. In addition, since the slits 32*a* and 32*b* allow the moving direction of the pinching plates 26*a* and 26*b* to be substantially limited to the contact and separation direction, the motions of the pinching plates 26*a* and 26*b* can be stabilized and the knob 22 can be held appropriately. However, this is merely an example. Therefore, even when support part 30 is not provided, the pair of pinching plates 26*a* and 26*b* can be separated from each other by a proper distance by appropriately selecting the number, size, spring constant, etc., of each of the coil springs 28*a* and 28*b*.

When attaching the smart lock 10 to the door 20 as shown in FIG. 1, an operator manipulates the housing 12 so that the knob 22 is inserted into a gap 36 between the pair of pinching plates 26*a* and 26*b*. Although it is desirable that the gap 36 have a width somewhat less than the thickness of the knob 22 before attachment, the pinching plates 26*a* and 26*b* are supported by the coil springs 28*a* and 28*b*, respectively, as described above. Thus, when the housing 12 is pressed against the knob 22, at least one of the pinching plates 26*a* and 26*b* is elastically displaced in the direction of contacting and separating from each other. Therefore, even when the operator does not precisely position the housing 12 with respect to the knob 22, the knob 22 can be smoothly inserted into the gap 36.

In order to facilitate the insertion of the knob 22, as shown in FIG. 4, it is preferable that the pinching plates 26*a* and 26*b* have tapered surfaces 38*a* and 38*b* at a portion (end surface) facing the bottom side (i.e., at a side into which the knob 22 is inserted), respectively. Depending on the shapes of the tapered surfaces 38*a* and 38*b*, the pair of pinching plates 26*a* and 26*b* may be in contact with each other before being attached. However, it is preferable that the pinching plates 26*a* and 26*b* are separated from each other by the predetermined distance due to the above support part 30, from the viewpoint of case of insertion of the knob 22. In addition, the tapered surface may be provided only on one of the pinching plates.

When the knob 22 is inserted into the gap 36, the distance between the pinching plates 26*a* and 26*b* is increased against the spring pressure of the coil springs 28*a* and 28*b*, and the knob 22 is pinched between the pinching plates 26*a* and 26*b*. At this time, the position of the holder 24 relative to the knob 22 is automatically adjusted so that the center of rotation of the knob 22 and the center of rotation of the holder 24 are aligned by the balance of the spring pressure of the coil springs 28*a* and 28*b*. Therefore, the operator can attach the smart lock 10 to the door 20 with sufficient accuracy for practical use by a simple operation which does not require time-consuming positioning or adjustment.

In the state in which the knob 22 is held by the holder 24, more specifically in the state in which the knob 22 is pinched between the pinching plates 26*a* and 26*b*, the knob 22 can be rotated together with the holder 24 by the drive mechanism 50 as described later. Further, when the rotation angle of the holder 24 becomes larger than the maximum rotation angle based on the specifications, etc., of the knob 22, at least one of the coil springs 28*a* and 28*b* can be elastically displaced so as to absorb excessive rotational movement of the holder 24, thereby preventing excessive force from being applied to the knob 22.

Figure 5:
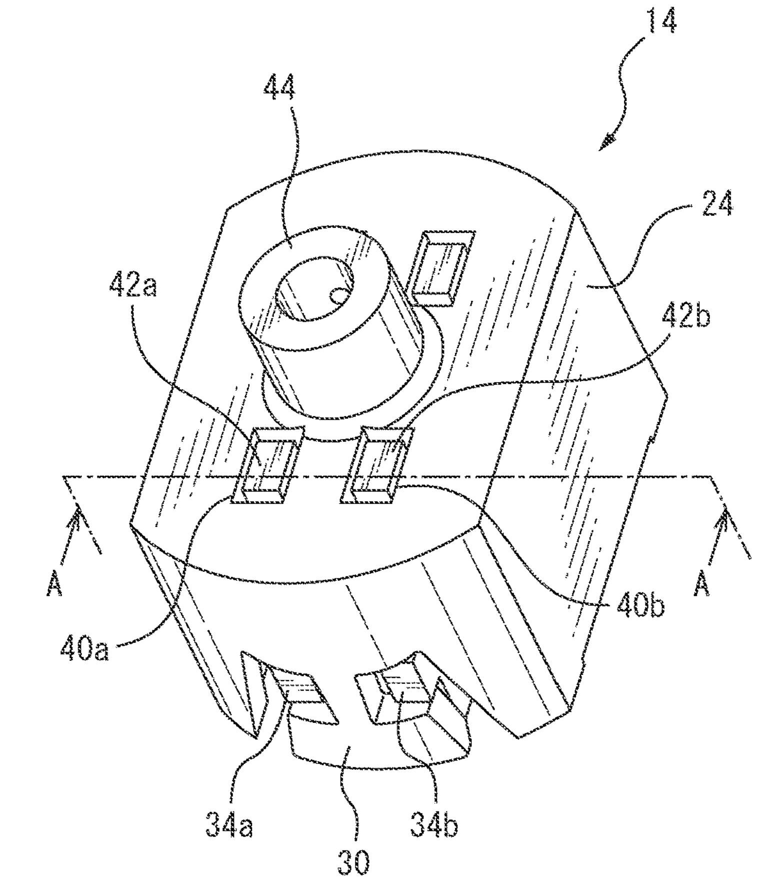
FIG. 5 is a perspective view of the knob holding structure of FIG. 4 viewed from another angle.

FIG. 5 is a view of the knob holding structure 14 viewed from the top side opposite to the bottom side, and FIG. 6 is a cross-sectional view taken along a line A-A in FIG. 5. The holder 24 is configured to support the pinching plates 26*a* and 26*b* so as to be capable of swinging in direction toward and away from each other. In the illustrated example, holes or recesses 40*a* and 40*b* are formed in an upper surface of the holder 24, and protrusions 42*a* and 42*b* formed on upper surfaces of the pinching plates 26*a* and 26*b* are engaged with holes 40*a* and 40*b*, respectively. Due to such a configuration, as shown in FIG. 6, the pinching plates 26*a* and 26*b* are capable of swinging about the holes 40*a* and 40*b*, respectively, and thus the knob 22 can be stably pinched and held while being attached.

Although there are no particular restrictions on the material of each member constituting the knob holding structure 14, the holder 24 and the pinching plates 26*a* and 26*b* are preferably made of resin from the viewpoint of case of manufacture and weight. On the other hand, the coil springs 28*a* and 28*b* are preferably made of metal. Elastic bodies other than the coil springs can also be used, such as leaf springs, rubber, and sponges, etc.

Figure 7:
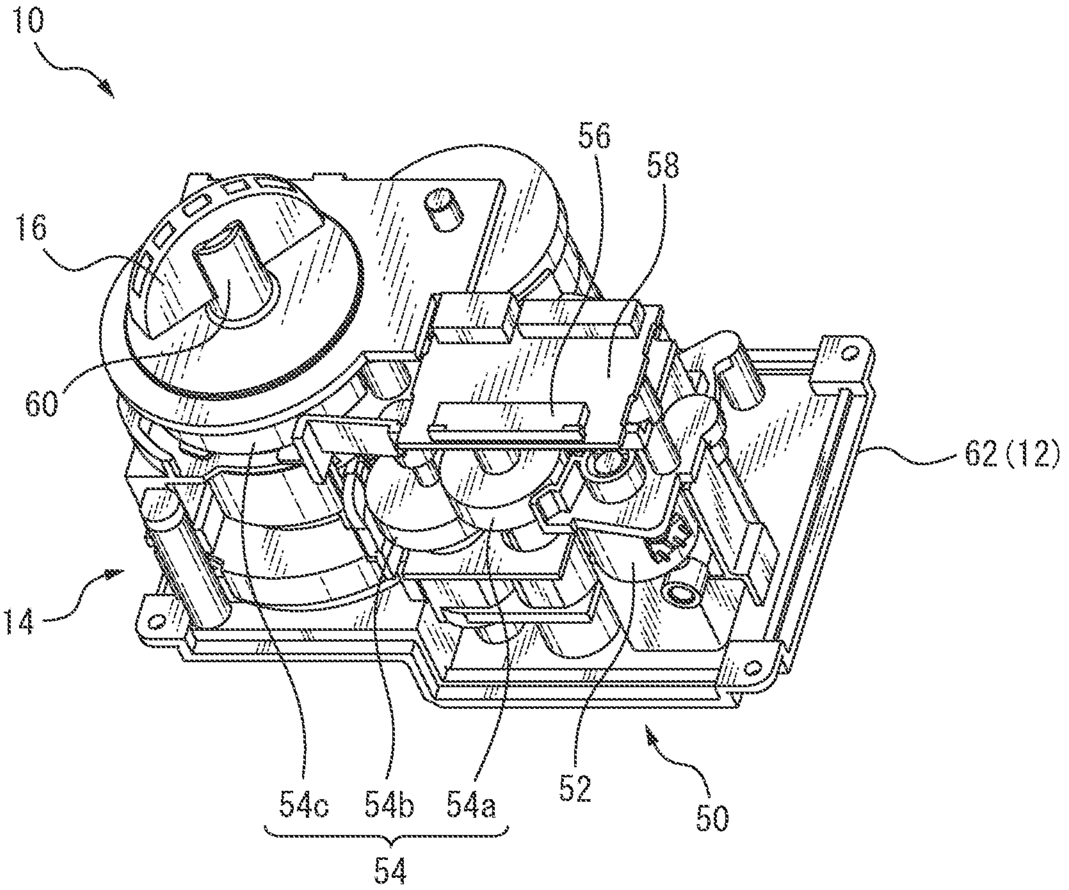
FIG. 7 is a perspective view of a drive mechanism of the knob holding structure.

FIG. 7 shows a configuration example of a drive mechanism 50 for rotationally driving the knob holding structure 14. The drive mechanism 50 has a drive motor 52 and a gear unit 54 configured to transmit the rotational torque of the drive motor 52 to the holder 24, and the entirety of the drive mechanism 50 can be accommodated within the housing 12. However, in FIG. 7, only a bottom part 62 having the attachment surface 18 (FIG. 2) of the housing 12 is shown for the purpose of explanation.

Within the housing 12, a control board 58 on which a processor 56, etc., is mounted can also be accommodated. The processor 56 is configured to control the drive motor 52 based on remote control from the electronic device such as a smart phone.

The gear unit 54 has at least one gear, and in the illustrated example, has three gears 54*a*, 54*b* and 54*c* engaged in series. When the gear 54*c* is engaged with the rotary shaft part 44 (sec FIG. 5) of the holder 24, the knob 22 held by the holder 24 is rotated by the rotation of the motor 52. However, this is merely an example, and the number of the gears and the number of teeth of each gear constituting the gear unit 54 can be appropriately selected, based on the specifications of the drive motor 52 and/or the desired rotational speed of the knob 22, etc.

It is preferable that the knob holding structure 14 be also manually rotatable. For example, by connecting a rotary shaft part 60 of the operation knob 16 to the rotary shaft part 44 (see FIG. 5) of the holder 24, the knob 22 held by the holder 24 can be rotated manually rotated when the operator rotates the operation knob 16.

All examples and conditional language provided herein are intended for the purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations can be made hereto without departing from the spirit and scope of the invention.

What is claimed is:

1. A knob holding structure comprising:

a holder;

a pair of pinching members configured to hold a knob and arranged opposed to each other in the holder; and an elastic member configured to support the pair of pinching members so that each pinching member can be displaced relative to an inner surface of the holder, and to bias the pinching members in a direction so as to approach each other.

2. The knob holding structure according to claim 1, wherein the holder has a slit configured to support the pair of pinching members and extending in a direction in which the pair of pinching members contact and separate from each other.

3. The knob holding structure according to claim 1, wherein the pair of pinching members are configured to be swingable about a part of the holder as a fulcrum.

4. The knob holding structure according to claim 1, wherein a least one of the pair of pinching members has a tapered surface at a side into which the knob is inserted.

5. A smart lock comprising:

a knob holding structure comprising:

a holder;

a pair of pinching members configured to hold a knob and arranged opposed to each other in the holder; and an elastic member configured to support the pair of pinching members so that each pinching member can be displaced relative to an inner surface of the holder, and to bias the pinching members in a direction so as to approach each other; and a drive mechanism configured to rotationally drive the holder.

* * * * *